United States Patent Office 3,382,228
Patented May 7, 1968

3,382,228
PROCESS FOR PREPARING AZOMALONANILIDE PIGMENTS
John E. Ferrari, Scarsdale, and Arthur P. Kurtz, Staten Island, N.Y., assignors to Interchemical Corporation, New York, N.Y., a corporation of Ohio
No Drawing. Filed May 3, 1965, Ser. No. 452,863
6 Claims. (Cl. 260—158)

ABSTRACT OF THE DISCLOSURE

Preparation of azomalonanilide pigments by coupling a diazonium salt with a malonanilide derivative in an organic solvent containing a substantial amount of an acid having a pKa value less than about 5. The organic solvent is inert towards the reactants and has substantial solvent action on them under the reaction conditions.

---

This invention relates to an improved process for manufacturing azomalonanilide pigments wherein the coupling step is carried out in a strongly acidic medium.

Application Ser. No. 267,791, filed Mar. 25, 1963, and now U.S. Patent No. 3,252,968, disclosed azomalonanilide pigments made by coupling in alkaline media. While it is true that alkaline media favors proton removal from malonanilides, they also promote decomposition of the diazo components, impairing the purity of the product and reducing the yield. The therein disclosed pigments were made with yields of 28, 34, 35, 44, 66, 67, and 82%.

It has now been found that coupling in strongly acidic media yields "crude" products as pure as the recrystallized products disclosed in the above mentioned application, while the yields are improved, usually to a striking degree. It is believed the herein disclosed coupling in strongly acidic media is new in the art. In this method the diazotization is carried out in a suitable organic solvent such as dimethylformamide with an acid such as sulfuric acid or acetic acid and a nitrite such as lower alkyl nitrites or alkali metal nitrites. The diazonium salt remains stable and substantially in solution throughout the coupling period. The malonanilide is dissolved in the solvent and added to the diazo solution. Coupling is usually complete in 1 to 3 hours. The "crude" products are of excellent purity compared to those obtained by the pyridine-base catalyst process, which was used in the aforementioned filed application. The essential features of the instant invention comprise a medium containing an organic solvent and a substantial amount of an acid catalyst system for enolization of malonanilides, and the consequent enhanced stability of the diazo solution, the acid having a pKa value of less than about 5.

PREPARATION OF THE MALONANILIDES

Malonanilide can be prepared according to the previously mentioned patent application, yielding a product with a melting point of 229–30° C. A commercially available, "label 3829" malonanilide, having a M.P. of 229–30° C., however, was used in all the instantly disclosed malonanilide reactions. 2,2′-dimethoxymalonanilide, recrystallized from isopropanol and with a M.P. of 165–167° C.; 2,2′-dimethylanilide, recrystallized twice from isopropanol and with a M.P. of 195–197° C.; and 2,2′-dichloromalonanilide, recrystallized from isopropanol and with a M.P. of 174.5–176.5° C. were all prepared by the method of the aforesaid patent application. 2,2′,4,4′-tetramethoxymalonanilide was prepared by heating at reflux temperature, under a blanket of nitrogen, a mixture of 1000 ml. xylene, 268 g. (1.75 mole) of 2,4-dimethoxyaniline, 131 g. (0.82 mole) of diethylmalonate, and 5 g. of the acid form of sulfonated polystyrene, sold under the name "Permutit Q," for 24 hours while 101 ml. ethanol distilled off. The charge was cooled to 80° C. and then 1000 ml. isopropanol and 20 g. activated charcoal, sold under the name "Darco 60," were added. The batch was digested ½ hour at 84° C., reflux temperature, filtered, and allowed to cool slowly. The light pink crystals were filtered and washed with 1000 ml. isopropanol before being dried in a 60–65° C. oven. The product did not show any change in melting point when recrystallized from isopropanol. 2,2′,5,5′-tetrachloromalonanilide was prepared by heating 24 hours at reflux a mixture of 500 g. (3.09 mole) of 2,5-dichloroaniline, 242 g. (1.51 mole) of diethylmalonate, and 3000 ml. of xylene. During this period 150 ml. ethanol and 500 ml. xylene distilled off. There were added 10 g. "Darco 60" and 30 g. "Celite 545" and then the batch was digested ½ hour at reflux before filtering. A product having a M.P. of 237–238.5 ° C. was obtained by filtration, washing with 1000 ml. of isopropanol, and drying at 50–55° C.

The bases used were all commercially available products.

All the pigments were prepared by adding 0.1 mole of the base to the organic solvent, such as dimethylformamide and cooled to 0–5° C. To this solution or slurry was added dropwise 0.2 mole of concentrated sulfuric acid and the temperature was again brought to 0–5° C. 0.1 mole of isoamyl nitrite, in the form of a 32% solution in dimethylformamide was added over a period of time sufficient to attain the maximum rate of addition possible without raising the temperature of the batch. The cold mixture was stirred one hour. A concentrated solution of 0.1 mole malonanilide in the same organic solvent, such as dimethylformamide was added dropwise to the diazo solution, again at the maximum rate possible without rise in temperature. The batch was stirred at 0–5° C. for 5 hours, followed by 16 hours at room temperature. The product was filtered and the solids slurried in water and again filtered.

The malonanilides were thus coupled to the following bases.

(1) Ortho-nitroaniline ("ONA")
(2) Alpha-aminoanthraquinone ("Scarlet AL")
(3) 2-amino-4-diethylsulfonamide anisole ("Red ITR")
(4) 2-methyl-5-nitroaniline ("Scarlet 6")
(5) 2,4-dinitroaniline ("2,4-DNA")
(6) 1-amino-5-benzoylamino anthraquinone (Vat base)
(7) p-Phenylazoaniline ("p-PAA")
(8) o-Chloroaniline ("Yellow 6G")
(9) 2-hydroxy-5-nitroaniline ("2-H-5-N-A-")
(10) 4′-nitro-4-aminophenyazobenzene ("4N-pPAA")
(11) 2-amino-4,5-dinitrobenzothiazole (Heterocyclic base).

In this application percentages and parts are on the weight basis.

Example 1.—Preparation of ortho-nitrophenyl-azomalonamilide 5.5 g. of ortho-nitroaniline were dissolved in 20 ml. of dimethylformamide and the solution was cooled to 5° C. 7.84 g. (0.08 mole) of sulfuric acid were added slowly, keeping the temperature below 15° C. The solution was brought to 0° C. and 16 ml. of a 2.5 N solution in dimethylformamide of amyl nitrite were added dropwise over a period of 30 minutes, keeping temperature at −5° to +5° C. and stirring continued for 1 hour afterwards. While this temperature was still maintained, there was then added dropwise over a period of 15 minutes a solution of 10.2 g. of malonanilide in 50 ml. of dimethylformamide. The cold mixture was stirred 4 hours more and then 50 ml. of dimethylformamide were added. The batch was then stirred 14 hours at about 20° C. 200 ml. water added, and the solid was filtered off. The filter cake was slurried in 300 ml. of hot water and again filtered. The dried solid was bright yellow and had a M.P. of 225.5–231° C. The yield was 87%.

Example 2.—Preparation of alpha-anthraquinoneazo-2,2'-di-methoxymalonanilide

The procedure of Example 1 was followed, but making the diazonium salt with 8.9 g. (0.04 mole) of 1-aminoanthraquinone in 60 ml. of dimethylformamide, 7.84 g. (0.08 mole) of sulfuric acid, 16 ml. of a 2.5 N solution of amyl nitrite in dimethylformamide, and then for coupling, adding a solution of 12.6 g. (0.04 mole) of 2,2'-dimethoxymalonanilide in 60 ml. of dimethylmalonanilide. The yield was 87% and the product had a melting point of 310–310.5° C.

Example 3.—Phenylazo-phenylazo-2,2',5,5'-tetrachloromalonanilide

A. Diazotization.—0.04 mole (7.9 g.) of phenylazoaniline was pulverized and added to 80 ml. of dimethylformamide and the temperature adjusted at about 0 to −5° C. .026 mole (6 ml.) of concentrated sulfuric acid was added dropwise, the temperature being maintained in the range of about 0 to −5° C. 17 ml. of a 2.5 N solution of isoamyl nitrite in dimethylformamide were added dropwise as quickly as possible while maintaining the temperature at about −5° C. The batch was stirred for 1 hour at about −5° C.

B. Coupling.—0.04 mole (15.7 g.) of 2,2',5,5'-tetrachloro malonanilide was dissolved in 70 ml. of dimethylformamide, the solution cooled to −5° C., and the diazotization solution (A) was added. It was stirred 6 hours at −5° C. then about 16 hours at room temperature. The batch was filtered, washed with isopropanol, the solid slurried with water and filtered until acid free.

Working over the filtered liquid disclosed that no pigment was present therein.

Example 4.—2,2',4,4'-tetramethoxymalonanilide azo pigment of 2-amino-4,6-dinitrobenzothiazole A. Diazotization.—0.04 mole (9.60 g.) of 2-amino-4,6-nitrobenzothiazole was dissolved in 100 ml. of 85% phosphoric acid by heating. It was cooled to about −10 to −15° C. and 0.04 mole (2.8 g.) of sodium nitrite was added slowly. The batch was maintained at about −10 to −15° C. for about 3 hours, with constant stirring.

B. Coupling.—0.04 mole (15 g.) of 2,2',4,4'-tetramethoxymalonanilide dissolved in 100 ml. of acetone was cooled to about 0 to −5° C. The diazotization solution (A) was cooled to the same temperature and added slowly over a 15-minute period. 150 ml. of acetone at a temperature of about 0 to −5° C. were used to wash out the diazo flask. The coupling ran for 4 hours at −10° C. and then about 16 hours at room temperature, whereupon the solution was washed with 200 ml. of isopropanol and filtered. The solid was slurried with warm water (70–80° C.) and filtered again. The remainder was dried in the oven at 55–60° C.

Although Example 3, for instance illustrates a preferred method of carrying out the process of this invention, various alternatives may be followed. The solvent system should be such that, in the coupling batch, the organic solvent dissolves at least a large proportion of the diazonium salt and the malonanilide intermediate. The solvent should also be inert under the reaction conditions insofar as the reactants and product are concerned. Useful solvents, widely applicable in this process, are for example dimethylformamide, tetrahydrofuran, dimethylsulfoxide, ethanol, various ethers such as glycol dimethyl ether, acetonitrile, etc. One skilled in the art should have little difficulty in choosing suitable solvent systems. Hydrocarbons are not good solvents in this process. Solvents which solidify at the process temperatures, such as dioxane and tertiary butyl alcohol would be undesirable. Aldehydes would be too reactive. Pyridine would affect the acidity of the system, etc. As for the acid that is to be present, any reasonably strong acid will do, provided it is at least about as strong as acetic acid, say, having a pKa value of less than about 5. The minimum amount of acid present would be roughly of the order of the amount originally bound up as diazonium salt, i.e., the amount of acid used in the diazotizing reaction. Sulfuric and phosphoric acids are preferred.

Although the absence of water in the system is not critical, still, when water is present it is desirable to keep the amount on the low side in order to improve the solvent action of the medium and sometimes to improve the stability of the reactants in the desired reaction.

The effect of lowered solubility, whether due to the presence of water in undesirable proportions or to poor solvent action of the organic liquid selected for the medium is to prolong unduly the time required to complete the reaction.

Besides the nitrites mentioned before, any low alkyl nitrite works, the alkyl having up to 5 carbons in the chain. Likewise alkali nitrites and their equivalents are suitable.

Besides the pigments described, other pigments can be made through other couplings of the bases and malonanilides listed. It is apparent, however, that the process may be applied to many more analogous compounds.

The pigments listed in the following table were made by the processes detailed in the examples, or by processes analogous to these, within the bounds of the invention as claimed. The yields and the melting points are shown.

|  | Pigments | Precipitated Crude | | Recrystallized Pure | |
|---|---|---|---|---|---|
|  |  | Yield, Percent | M.P., ° C. | Yield | M.P., ° C. |
| 1 | O-nitrophenylazomalonanilide | 87 | 225.5–231 | 73 | 226.5–230 |
| 2 | O-nitrophenylazo-2,2'-dimethoxymalonanilide | 89 | (1) | 54 | 268.5–270 |
| 3 | O-nitrophenylazo-2,2'-dimethylmalonanilide | 58 | 199–202 | 40 | 220–221 |
| 4 | O-nitrophenylazo-2,2'-dichloromalonanilide | 68 | 238–240 | 46 | 248.5–250 |
| 5 | Alpha-anthraquinoneazomalonanilide | 91 | 265–267 | 70 | 268.5–270 |
| 6 | Alpha-anthraquinoneazo-2-2'-dimethoxymalonanilide | 87 | 310–310.5 | 72 | 308–309.5 |
| 7 | Alpha-anthraquinoneazo-2-2'-dimethylmalonanilide | 77 | 293.3–300 | 75 | 299–300.5 |
| 8 | Alpha-anthraquinoneazo-2-2'-dichloromalonanilide | 87 | (2) | 79 | 319–320 |
| 9 | 3-diethylsulfonamide-5-methoxyphenylazomalonanilide | 61 | 185–191.5 | 31 | 204.5–206 |
| 10 | 3-diethylsulfonamide-5-methoxyphenylazo-2-2'-dimethoxymalonanilide | 64 | 246–247.5 | 55 | 243.5–245 |
| 11 | 3-diethylsulfonamide-5-methoxyphenylazo-2-2'-dimethylmalonanilide | 55 | 229–231 | 39 | 231.5–232 |
| 12 | 3-diethylsulfonamide-5-methoxyphenylazo-2-2'-dichloromalonanilide | 36 | 231–252 | 20 | 258–260 |
| 13 | 2-methyl-5-nitrophenylazomalonanilide | 37 | 250–253.1 | 25 | 250–252 |
| 14 | 2-methyl-5-nitrophenylazo-2-2'-dimethoxy malonanilide | 58 | 251–257 | 46 | 255–256.5 |
| 15 | 2-methyl-5-nitrophenylazo-2,2'-dimethylmalonanilide | 32 | 242–243 | 23 | 240–241.5 |
| 16 | 2-methyl-5-nitrophenylazo-2,2'-dichloromalonanilide | 51 | 278–281.5 | 39 | 281–282 |
| 17 | O-p-dinitrophenylazomalonanilide | 53 | 287.5–292 | 30 | 292–294 |
| 18 | O-p-dinitrophenylazo-2-2'-dimethoxymalonanilide | 65 | 334–338 | 64.5 | 337–338 |
| 19 | O-p-dinitrophenylazo-2-2'-dimethylmalonanilide | 30 | 310 | 26 | 306.5–308 |
| 20 | O-p-dinitrophenylazo-2,2'-dichloromalonanilide | 44 | 271–282 | 20 | 316–318 |
| 21 | α-anthraquinoneazo-2,2',4,4'-tetramethoxy malonanilide | 98.7 | 320–322 | 46+ | 327–328 |
| 22 | 2,4-dinitrophenylazo-2,2',4,4'-tetramethoxy malonanilide | 31 | 303–306 | 24+ | 309–310.5 |
| 23 | 1-(2,2',4,4'-tetramethoxy malonanilido azo)-5-benzoylaminoanthraquinone | 69 | 360–362 | 60 | 362–363 |
| 24 | p-Phenylazo-phenylazo-2,2,4,4'-tetramethoxymalonanilide | 85 | 228–229 | 65.70 | 233–234 |
| 25 | o-Chlorophenylazo-2,2'-dimethoxy malonanilide | 83 | 199–202 | 67 | 208–209.5 |
| 26 | Alpha-anthraquinoneazo-2,2',5,5'-tetrachloro-malonanilide | 84 | 320–321 | 75 | 323–324 |

1 Dec. 266–268.
2 Dec. 315–317.

The pigments of this invention can be used, for example, as disperse dyes for Dacron, nylon, and cellulose acetate. The latter application may be carried out by adding 10 g. of cellulose acetate cloth to a solution of 0.10 g. of "Duponol RA" in 300 cc. water and heating to about 85° C. The cloth is then removed and added to a dyebath prepared by dispersing 0.1 g. of the dye (for a 1% dyeing) in 2 cc. of a 5% "Duponol RA" solution, and then diluting to 300 cc. with warm distilled water. The dyebath is then slowly heated to about 83–85° C., with constant agitation and that temperature maintained for about 50 minutes. The cloth is then rinsed thoroughly in warm water and dried at a lukewarm temperature. "Duponol RA" is a fortified ether alcohol sulfate.

What is claimed is:

1. A process for preparing azomalonanilide pigments consisting in coupling a diazonium salt with a malonanilide derivative in a medium consisting of a substantial proportion of an acid having a pKa value less than about 5 in a liquid organic solvent that in inert towards the reactants and filtering, washing, and drying the recovered solids.

2. The process of claim 1 wherein the diazonium salt is selected from the group consisting of the salts of diazotized ortho-nitroaniline, diazotized alpha-aminoanthraquinone, diazotized 2 - amino - 4 - diethyl - sulfamyl anisole, diazotized 2 - methyl-5-nitroaniline, diazotized 2,4-dinitroaniline, diazotized 1 - amino - 5 - benzoylaminoanthraquinone, diazotized p - phenylazo - aniline, diazotized o - chloroaniline, diazotized 2 - hydroxy - 5 - nitroaniline, diazotized 4' - nitro - 4 - amino - phenylazobenzene, and diazotized 2 - amino - 4,5 - dinitrobenzothiazole, and the malonanilide derivative is selected from the group consisting of malonanilide; 2,2'-dimethoxymalonanilide; 2,2' - dimethylmalonanilide; 2,2' - dichoromalonanilide; 2,2',4,4' - tetramethoxymalonanilide; and 2,2',5,5'-tetrachloromalonanilide.

3. The process described in claim 1, wherein the strong acid is selected from the group consisting of concentrated sulfuric acid and 85% phosphoric acid.

4. The process described in claim 2, wherein the strong acid is selected from the group consisting of concentrated sulfuric acid and 85% phosphoric acid.

5. The process described in claim 3, wherein the strongly acidic medium contains a major proportion of a solvent selected from the group consisting of dimethylformamide, tetrahydrofuran, ethanol, and dimethylsulfoxide.

6. The process described in claim 4, wherein the strongly acidic medium contains a major proportion of a solvent selected from the group consisting of dimethylformamide, tetrahydrofuran, ethanol, and dimethylsulfoxide.

References Cited

UNITED STATES PATENTS 2,556,743  6/1951  Long et al. _____ 260—193 X

CHARLES B. PARKER, *Primary Examiner.*

F. D. HIGEL, *Assistant Examiner.*